United States Patent [19]

Nishiwaki et al.

[11] Patent Number: 5,137,570
[45] Date of Patent: Aug. 11, 1992

[54] INK JET RECORDING DEVICE AND CARTRIDGE THEREFORE

[75] Inventors: Osamu Nishiwaki; Kazuo Iwata; Shinichi Tochihara; Hitoshi Sugimoto, all of Kanagama, Japan

[73] Assignee: Canon Kabushiki Kaisha, Tokyo, Japan

[21] Appl. No.: 739,411

[22] Filed: Aug. 2, 1991

Related U.S. Application Data

[63] Continuation-in-part of Ser. No. 466,602, Jan. 17, 1990.

[30] Foreign Application Priority Data

Jan. 27, 1989 [JP] Japan .................................. 1-18009
May 11, 1989 [JP] Japan ................................ 1-119602
Nov. 17, 1989 [JP] Japan ................................ 1-299220

[51] Int. Cl.⁵ ............................................. C09D 11/02
[52] U.S. Cl. .................................. 106/22; 106/20; 346/1.1
[58] Field of Search .............. 106/20, 22; 534/724, 534/573, 583, 815

[56] References Cited

U.S. PATENT DOCUMENTS

| | | | |
|---|---|---|---|
| 4,601,756 | 7/1986 | Ohita et al. | 106/22 |
| 4,724,001 | 2/1988 | Ohata et al. | 106/22 |
| 4,765,838 | 8/1988 | Ohata et al. | 106/22 |
| 4,908,062 | 3/1990 | Balmforth et al. | 106/22 |
| 4,986,850 | 1/1991 | Iwata et al. | 106/25 |
| 5,814,037 | 6/1991 | Ohata et al. | 534/815 |

FOREIGN PATENT DOCUMENTS 285275 12/1986 Japan .

Primary Examiner—Mark L. Bell
Assistant Examiner—Helene Klemanski
Attorney, Agent, or Firm—Fitzpatrick, Cella, Harper & Scinto

[57] ABSTRACT

A recording liquid containing a dye, glycerine, an aliphatic monohydric alcohol and water. The dye is a mixture of C.I. Food Black 2 and at least one compound selected from compounds which are represented by the following general formulas [I] and [II]:

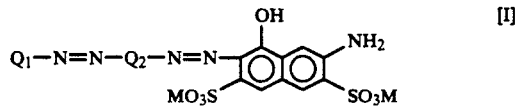

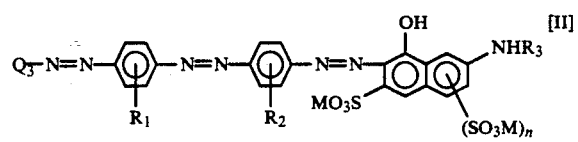

where Q1 is a phenyl group or a naphthyl group which are substituted by a lower alkyl carbonylamino group and a lower alkoxy group or a naphthyl group substituted by a SO₃M group, Q2 is a naphthyl group substituted by a SO₃M group or a phenyl group substituted by a lower alkoxy group, Q3 is a phenyl group, a naphthyl group, or a phenyl group or a naphthyl group which are substituted by a SO₃M group, $R_1$ and $R_2$ are each a lower alkyl group, a lower alkoxy group or a lower alkyl carbonylamino group, $R_3$ is a hydrogen or a phenyl group substituted by a SO₃M group, n is 0 or 1, and M is an alkaline metal or an ammonium cation.

39 Claims, 3 Drawing Sheets

INK JET RECORDING DEVICE AND CARTRIDGE THEREFORE

RELATED APPLICATION

This is a continuation-in-part of application Ser. No. 07/466,602 filed Jan. 17, 1990.

BACKGROUND OF THE INVENTION

1. Field of the Invention

The present invention relates to a novel recording liquid which provides high density images having excellent waterfastness and high quality for recording on sheets of paper normally used in offices or schools. The present invention also relates to an ink jet recording method of the type in which such a recording liquid is ejected for recording by he action of thermal energy.

2. Description of the Related Art

Various types of compositions have been proposed as inks for use in recording images on a material, such as a sheet of paper. Such inks may be used in conjunction with writing implements, stamps, recorders or ink jet recording devices. Typical inks are composed of various types of dyes and water or other organic solvents in which the dyes are dissolved or dispersed.

Various types of ink jet recording methods are known. Typical examples include: an ink jet recording method in which a portion of the charged droplets which are generated in sequence are used for recording; an ink jet recording method in which a signal is supplied to a recording head incorporating a piezoelectric element so that a droplet of a recording liquid can be generated in response to the signal supplied for recording; and an ink jet recording method in which thermal energy is applied to a recording liquid contained in a chamber of a recording head in accordance with a recording signal so as to generate a droplet. Owing to their peculiarity, such ink jet recording methods require a recording liquid which satisfies stricter conditions as compared with those recording liquids used in conjunction with the writing implements, stamps or recorders.

Those conditions include:

(1) A recording liquid which allows vivid images having a contrast to be recorded at a high density.

(2) A recording liquid which allows high-quality images to be recorded on any type of recording medium without irregular blurring.

(3) A recording liquid which can be fixed to a recording medium quickly (e.g., can be dried quickly on a recording medium) and firmly, and cannot therefore be scrubbed off.

(4) A recording liquid which ensures that the printed images exhibit excellent waterfastness and lightfastness.

(5) A recording liquid which can be ejected from a fine orifice stably in the form of droplets without clogging the orifice.

(6) Even when kept uncapped while the recording is being suspended, a recording liquid is provided which can be ejected stably immediately after recording has been restarted. In other words, ink located near the orifice is not readily dried, thus preventing clogging.

(7) A recording liquid which can be stored stably for a long period of time without deterioration in the ink performance.

(8) A recording liquid which does not corrode the member with which it is in contact.

(9) A recording liquid which is safe, non-toxic and not flammable.

In order to fulfill all the conditions described above, various ink jet components have been proposed. However, none of them fulfills all the above conditions.

Recording liquids which contain a certain type of disazo dye, a certain type of trisazo dye or a combination of these dyes have been proposed in the specifications of, for example, U.S. Pat. Nos. 4,724,001, 4,765,838 and Japanese Patent Laid-Open No 285275/1986. These recording liquids exhibit excellent thermal stability and excellent waterfastness, can be stored stably for a long time without degradation in the quality, and are capable of preventing clogging as compared to a recording liquid which contains a conventionally employed dye.

U.S. Pat. No. 4,601,756 discloses an improved black color ink which contains both C.I. Food Black 2 and dyes having other color tones.

Although the above-described recording liquids exhibit the aforementioned various characteristics, they do not provide images having both excellent waterfastness and high density.

SUMMARY OF THE INVENTION

An object of the present invention is to provide a recording liquid which enables vivid images to be recorded on various types of sheets of paper at high density and quality without generating irregular blurs, which exhibits excellent fixing characteristics and waterfastness. It is another object to provide a recording liquid which does not cause clogging and which can be stored stably for a long period of time without deterioration in the quality. It is an additional object to provide a recording liquid which is thermally stable and safe, as well as an ink jet recording method which employs such a recording liquid.

In order to achieve the aforementioned objects, the present invention provides a recording liquid comprising a dye and a compatible liquid carrier medium therefor, such as glycerine, an aliphatic monohydric alcohol and water. The dye is a mixture of C.I. Food Black 2 and at least one compound selected from compounds which are represented by the following general formulas [I] and [II]:

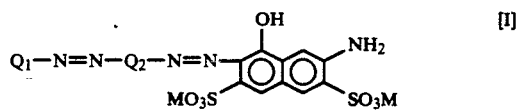

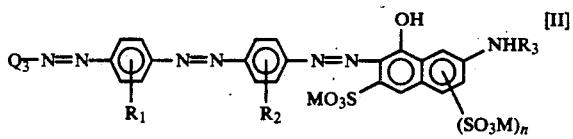

where Q1 is a phenyl group or a naphthyl group which are substituted by a group selected from a lower alkyl carbonylamino group and a lower alkoxy group or a naphthyl group substituted by a SO3M group, Q2 is a naphthyl group substituted by a SO3M group or a phenyl group substituted by a lower alkoxy group, Q3 is a phenyl group, a naphthyl group, or a phenyl group or a naphthyl group which are substituted by a SO3M group, R1 and R2 are each a lower alkyl group, a lower alkoxy group and a lower alkyl carbonylamino group, R3 is hydrogen or a phenyl group substituted by a SO3M group, n is 0 or 1, and M is an alkaline metal or an ammonium cation.

The present invention also provides a recording liquid which contains a dye, a urea compound selected from urea or thiourea and a liquid carrier medium, including, preferably, glycerine, an aliphatic monohydric alcohol and water. The dye is a mixture of C.I. Food Black 2 and at least one compound selected from compounds which are represented by the following general formulas [I] and II]:

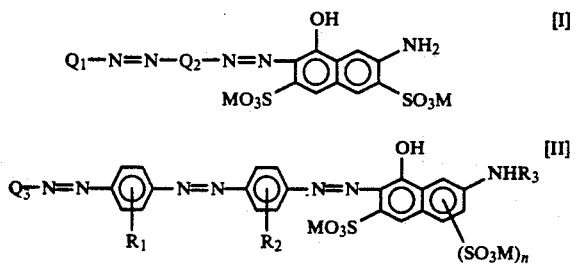

wherein Q1, Q2, Q3, $R_1$, $R_2$, $R_3$, n, and M are as above.

The present invention also provides a recording liquid comprising a dye, urea, and a liquid carrier medium such as glycerine, thiodiglycol, isopropyl alcohol, and water. The dye is a mixture of C.I. Food Black 2 and at least one compound selected from compounds which are represented by the following general formulas [I] and [II]:

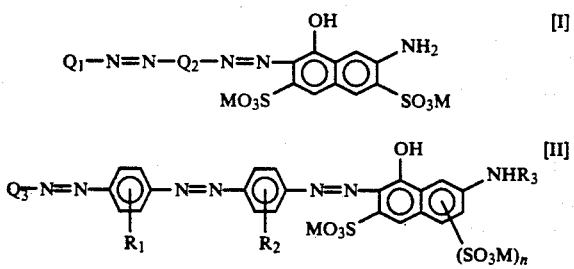

wherein Q1, Q2, Q3, $R_1$, $R_2$, $R_3$, n, and M are as above.

The present invention further provides an ink jet recording method in which an recording ink is ejected for recording from a fine orifice toward a recording material in the form of a droplet utilizing a thermal energy. The recording ink contains a dye and a compatible liquid carrier medium. The liquid carrier medium is preferably glycerine, an aliphatic monohydric alcohol and water. The dye is a mixture of C.I. Food Black 2 and at least one compound selected from compounds which are represented by the following general formulas [I] and [II]:

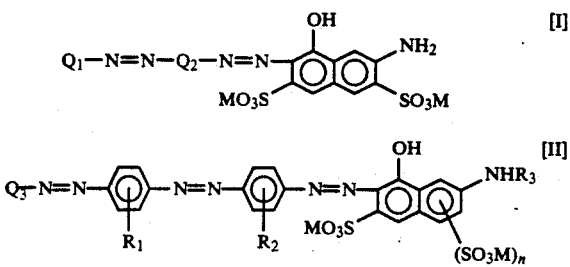

wherein Q1, Q2, Q3, $R_1$, $R_2$, $R_3$, n, and M are as above.

DETAILED DESCRIPTION OF THE PREFERRED EMBODIMENTS

Figure 1A:
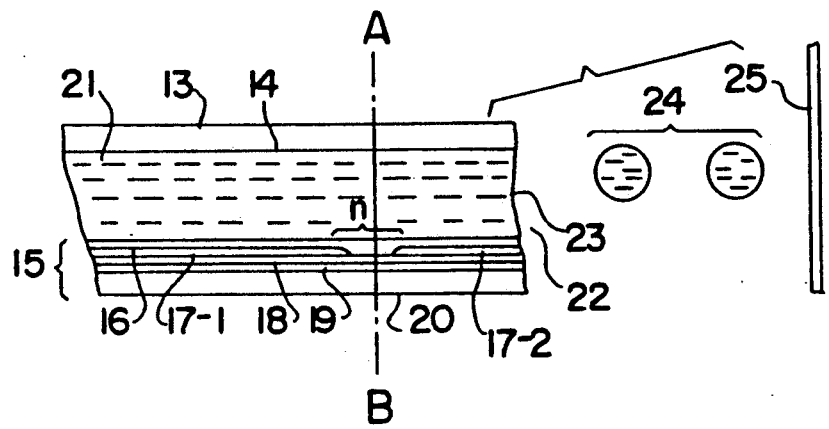
FIGS. 1(a) and 1(b) are respectively a longitudinal sectional view and a cross-sectional view of the head part of an ink jet recording device.

C.I. Food Black 2 and the dyes represented by the general formulas [I] and [II] are water-soluble black dyes, which are thermally stable and therefore assure a stable ejection of an ink in a recording method according to the present invention which utilizes thermal energy. Preferably, these dyes are used in a refined or purified form. C.I. Food Black 2 has a low molecular weight and exhibits a low degree of dispersion of the light that it absorbs. In consequence, it permits vivid images to be recorded at a high density. However, C.I. Food Black 2 exhibits a degraded waterfastness.

The dye represented by the general formula [II] is characterized by its high molecular weight and a high degree of dispersion of the light that it absorbs. In consequence, images recorded using the ink containing this dye lack vividness, and have a low density. However, the dye represented by the general formula [II] has a higher substantivity and therefore exhibits excellent waterfastness. The dye represented by the general formula [I] exhibits a performance which is between that of C.I. Food Black 2 and that of the dye represented by the general formula [II]. Thus, a combination of the above-described three types of dye allows vivid images exhibiting waterfastness to be recorded at high density and contrast.

With a color tone of a resultant ink taken into consideration, the most desirable combination may be the use of all of the three types of dye.

C.I. Food Black 2 employed in the present invention includes that having the following structural formula [III]:

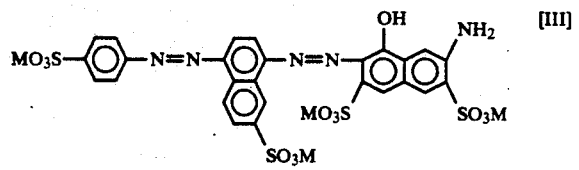

where M is an alkaline metal, such as Na, K or Li, or an ammonium cation.

The lower alkyl carbonylamino group incorporated in the structure of the dyes represented by the general formulas [I] and [II] may be an alkyl carbonylamino group whose total number of carbon atoms ranges from 1 to 4. The lower alkoxy group may be an alkoxy group whose total number of carbon atoms ranges from 1 to 4, e.g., a methoxy group and an ethoxy group. The lower alkyl group may be an alkyl group whose total number of carbon atoms ranges from 1 to 4, e.g., a methyl group and a ethyl group.

M represents an alkaline metal such as Na, K, or Li, or an ammonium cation such as $NH_4^\oplus$, $NH(C_2H_4OH)_3^\oplus$ or $NH(CH_3)_3^\oplus$.

Examples of the dye represented by the general formula [I] are as follows:

No. 1
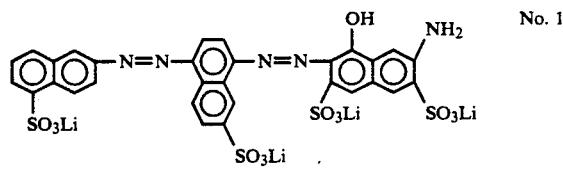

No. 2
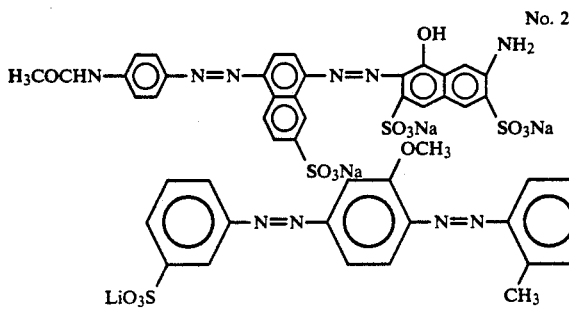

No. 3
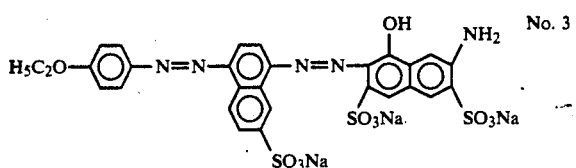

No. 4
No. 5
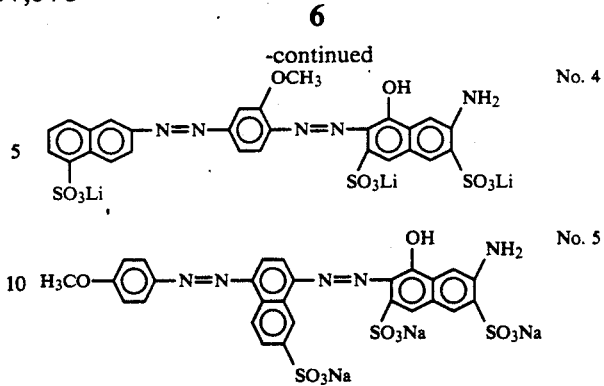

Next, examples of the dye represented by the general formula [II] are as follows:

No. 6
No. 7
No. 8
No. 9
No. 10

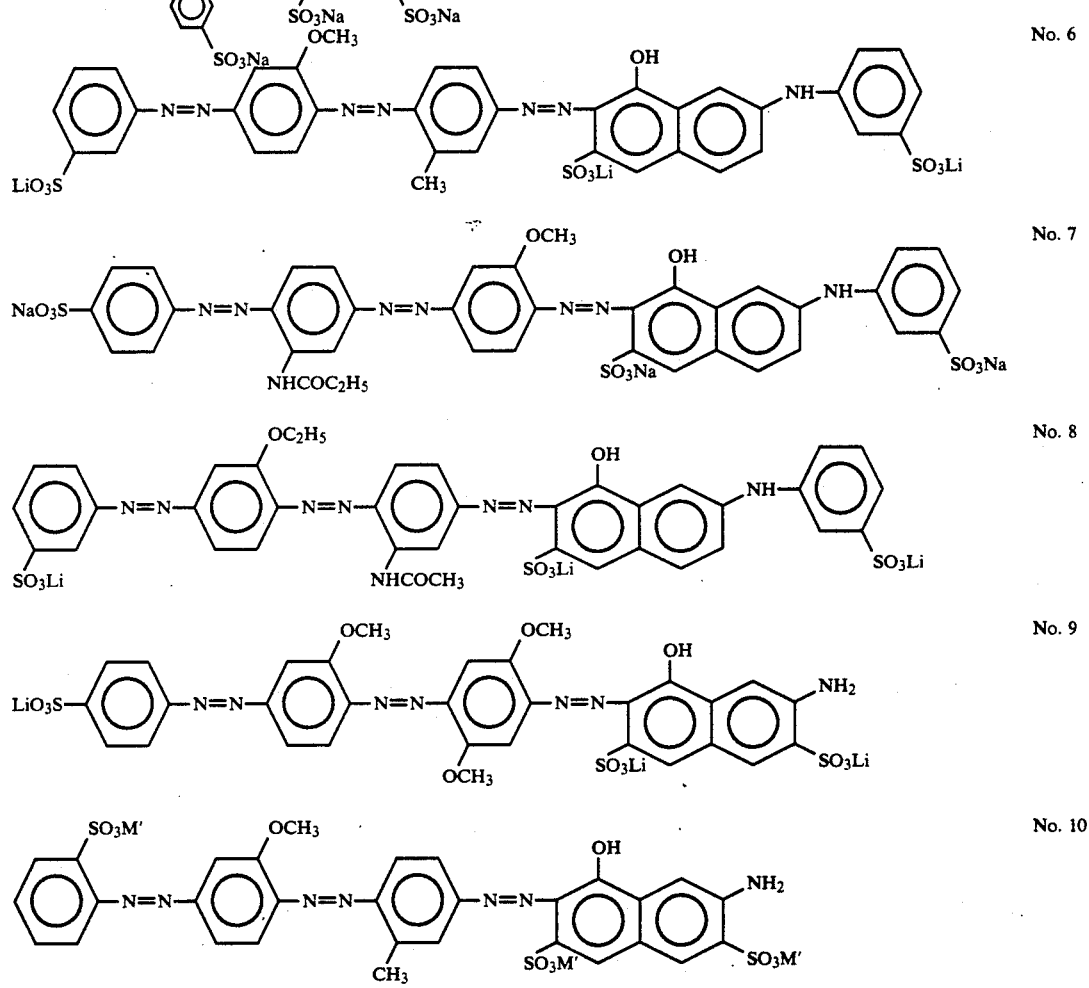

The most desirable from of a dye employed in the present invention may be a mixture which contains C.I. Food Black 2, a compound of formula [I] indicated by No. 1, and a compound of formula [II] indicated by No. 6.

It was found desirable to mix C.I. Food Black 2 and the dye represented by the general formulas [I] and/or [II] in a ratio (weight ratio) from 8:2 to 2:8, more preferably, in a ratio ranging from 3:1 to 1:3. In the case where both the dye represented by the general formula [I] and the dye represented by the general formula [II] are employed, they are preferably mixed in a weight ratio ranging from 2:1 to 1:2.

The preferred amount of dye contained in the recording liquid is from 0.1 wt % to 15 wt %, and more preferably, from 1 wt % to 5 wt %. Unless otherwise indicated, all weights are based on the total weight of the recording liquid. The above-described dyes may be used together with other dyes.

Next, a dye-compatible liquid medium carrier employed in the present invention will be described in detail below.

Conventionally used liquid media carrier include solvents having a high boiling point, such as polyhydric alcohols. Such solvents having a high boiling point are capable of preventing clogging. However, they have a low surface tension, and this allows droplets of the resultant recording liquid to be spread irregularly over a sheet of paper, thereby degrading the quality of an image. Hence, when the solvents having a high boiling point such as polyhydric alcohols are used, it is difficult to simultaneously prevent clogging and to provide an image having a high quality. Glycerine, which is employed in the present invention, has a high surface tension, although it has a high boiling point. This results in an image having a high quality. Furthermore, glycerine is highly hygroscopic, so a small amount of glycerine is enough to prevent clogging. Glycerine may be contained in the recording liquid in an amount ranging from 1 wt % to 30 wt %, and preferably, ranging from 3 wt % to 15 wt %.

In addition to glycerine, other solvents, e.g., thiodiglycol, may be added to the recording liquid according to the present invention. Such solvents may be added in an amount which does not adversely affect the prevention of clogging and production of an image having a high density.

Thiodiglycol is effective in improving the coloring density of a dye, and allows the resultant ink to be ejected from an orifice smoothly after recording has been suspended for a time.

In the present invention, a urea compound, such as urea or thiourea, may be used together with glycerine for further improving prevention of clogging and for further increasing the concentration of the dyes in the recording liquid.

It is known that the addition of urea or thiourea in an ink is effective to prevent clogging. The present inventors discovered that, when urea or thiourea are together with glycerine, no clogging of the ink occurred even when the ink contained a larger amount of dye. Further, he viscosity of the resultant recording liquid remained low and the ink maintained fluidity when the water in the recording liquid was evaporated and the recording liquid contained only glycerine, the dyes, and the above-described compounds. Hence, the use of urea or thiourea permits the amount of polyhydric alcohol to be decreased relative to the amount of dyes added, thus allowing the quality and the fixing characteristics of recorded image to be further improved.

Glycerine employed in the present invention has a high boiling point, and is highly viscous. Glycerine does not effectively dissolve the dye employed in the present invention, thereby limiting the amount of dye to be employed. It is therefore necessary for the amount of glycerine to be increased in order to achieve sufficient image density and clogging prevention effects. However, the use of a large amount of glycerine increases the viscosity of the ink and degrades the ejection stability, which leads to problems in ejection of the ink.

Further, the use of a very large amount of glycerine degrades the quality of an image recorded. For the aforementioned reasons, the addition of urea or thiourea is important for maintaining the quality of an image, for preventing clogging, for providing high image density and for ejection stability. The use of urea or thiourea is particularly effective when urea or thiourea is added to a recording liquid according to the present invention which contains the dye and the liquid carrier medium, such as glycerine, water and a monohydric alcohol.

In the present invention, urea or thiourea may be contained in a recording liquid in an amount ranging from 0.5 wt % to 20 wt %, and preferably, in an amount ranging from 1 wt % to 10 wt %.

The aliphatic monohydric alcohol is added to a recording liquid which contains, for example, the dye, glycerine and water for the purpose of improving the fixing characteristics (the drying ability of an image). Conventionally, it has been proposed to use a penetrant such as a surface-active agent. However, even though the use of a penetrant improves the fixing characteristics, it allows the resultant ink to be spread over a sheet of paper, thus generating irregular blurs and thereby degrading the quality of an image. An aliphatic monohydric alcohol, which is employed in the present invention, allows the resultant ink to be spread uniformly, and accelerates the ability of the resultant ink to pass droplets through the sheet of paper and to be evaporated. Consequently, the use of an aliphatic monohydric alcohol improves the fixing characteristics of the ink without the quality of an image being degraded.

Suitable aliphatic monohydric alcohols include ethyl alcohol, isopropyl alcohol, and n-butyl alcohol.

Isopropyl alcohol may be the most desirable one because it has no offensive odor, and is capable of improving the fixing characteristics without degrading the quality of an image to be recorded.

An aliphatic monohydric alcohol may be contained in a recording ink in an amount ranging from 0.1 wt % to 10 wt %, and preferably, in an amount ranging from 1 wt % to 5 wt %.

Water may be contained in a recording liquid in an amount ranging from 60 wt % to 90 wt %, and preferably, in an amount ranging from 70 wt % to 90 wt %.

In addition to the ingredients described above, a viscosity adjusting agent, a surface tension adjusting agent, a pH adjusting agent, a mildewproofing agent, and an anti-corrosive may also be added to the recording liquid according to the present invention.

When ink jet recording is performed on various types of sheets of paper using the recording ink according to the present invention, such problems as reduction in the quality of an image, reduction in the density of an image and deterioration of the fixing characteristics, which may be caused owing to the type of the paper employed, can be eliminated and excellent recording is therefore possible.

The recording liquid of the present invention is preferably used in the ink jet recording method in which ink droplets are discharged by employing thermal energy. However, the recording solution can also be used for general writing utensils.

An example of the recording apparatus which is preferable for recording by using the ink of the present invention is an apparatus in which ink droplets are produced by applying heat energy to the ink in the chamber of a recording head in correspondence with a recording signal.

Figure 1B:
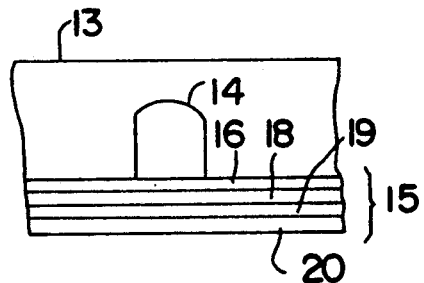
Figure 2:
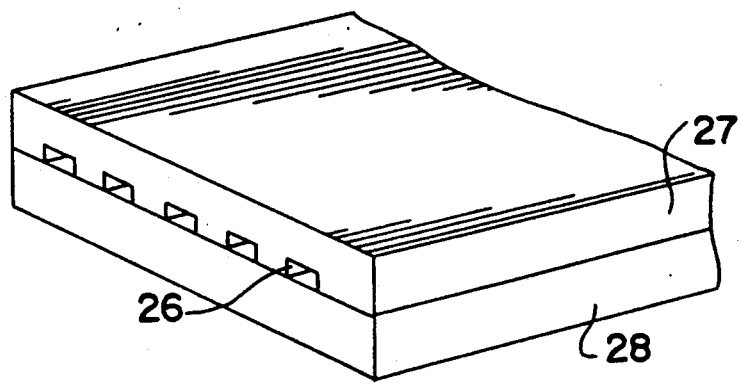
FIG. 2 is a perspective view of the appearance of a multiple head which comprises the head shown in FIG. 1.

FIGS. 1(a), 1(b) and 2 show examples of the structure of a head, which is a principal part of an ink jet recording apparatus.

In the drawings, a head 13 is formed by bonding a glass, ceramic or plastic plate, which has a groove 14 for allowing ink to pass therethrough, and a heating head 15 used for heat-sensitive recording. Although a thin film head is shown in the drawings, the head is not limited to such an embodiment. The heating head 15 comprises a protective film 16 made of silicon oxide or the like, aluminum electrodes 17-1, 17-2, a heating resistor layer 18 made of nichrome or the like, a heat-accumulating layer 19 and a substrate 20 made of aluminum or the like and having good heat radiation properties.

Ink 21 reaches a discharging orifice (micropore) 22 and forms a meniscus 23 at pressure P.

When an electrical signal is applied to the electrodes 17-1, 17-2, a region off the heating head 15, which is denoted by n, rapidly generates heat so as to generate air bubbles in the ink 21 which contacts with the region. The meniscus 23 is projected by the pressure generated, and the ink 21 is discharged as a jet of ink droplets 24 from the orifice 22. The droplets 24 are propelled toward a recording material 25. FIG. 2 shows a multiple head comprising a plurality of the heads shown in FIG. 1(a) which are arranged in parallel. The multihead is formed by bonding a glass plate 27 having a plurality of grooves 26 and a heating head 28, which is the same as that shown in FIG. 1(a).

FIG. 1(a) is a sectional view taken along the ink flow channel of the ink, and FIG. 1(b) is a sectional view taken along the line A-B in FIG. 1(a).

Figure 3:
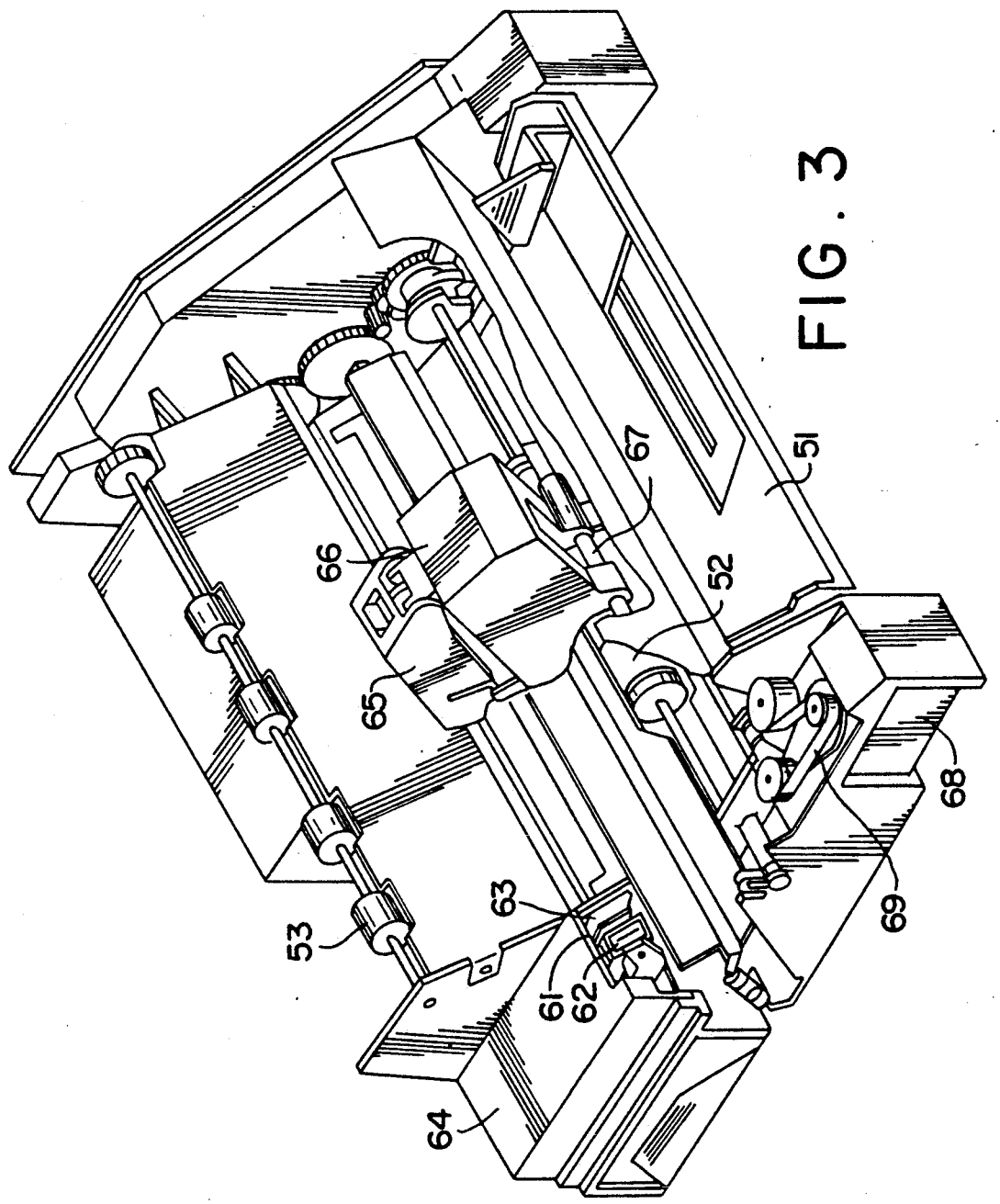
FIG. 3 is a perspective view of an example of an ink jet recording apparatus.

FIG. 3 shows an example of an ink jet recording apparatus in which the head shown in FIG. 1 is incorporated.

In FIG. 3, reference numeral 61 denotes a blade serving as a wiping member in the form of a cantilever in which one end is a fixed end held by a blade holding member. The blade 61 is disposed at a position adjacent to a region of recording by a recording head. In this example, the blade 61 is held in a position in which it projects in the path of the movement of the recording head. Reference number 62 denotes a cap which is disposed at a home position adjacent to the blade 61 and which is moved in the direction vertical to the moving direction of the recording head so as to contact with the orifice surface for the purpose of capping. Reference number 63 denotes an ink absorber which is disposed at a position adjacent to the blade 61 and which is held in a position in which it projects in the path of the movement of the recording head in the same way as the blade 61. The blade 61, the cap 62 and the absorber 63 form a discharging recovery part 64. Moisture and dust on the ink orifice surface are removed by the blade 61 and the absorber 63.

Reference numeral 65 denotes the ink jet device which has a means for generating discharging energy so as to record an image by discharging the ink to the recording material opposite to the orifice surface having orifices. Reference number 66 denotes a carriage for moving the ink jet device 65 which is loaded thereon. The carriage 66 is slidably engaged with a guide shaft 67 and is partially connected (not shown) to a belt 69 which is driven by a motor 68. This permits the carriage 66 to move along the guide shaft 67 and move in the region of recording by the ink jet device 65 and the region adjacent thereto.

Reference numeral 51 denotes a sheet feeding part, and reference numeral 52 denotes a sheet feeding roller which is driven by a motor (not shown). This arrangement allows the recording paper to be fed to a position opposite to the orifice surface of the recording head and to be delivered to a take-off part having a take-off roller 53 during the progress of recording.

In the aforementioned arrangement, when the ink jet device 65 is returned to the home position at the end of recording, the cap 62 is retracted from the path of the movement of the ink jet device 65, while the blade 61 is projected in the path of the movement. As a result, the orifice surface of the ink jet device 65 is wiped by the blade 61. When the cap 62 contacts with the orifice surface of the recording head 65 so as to cap it, the cap 62 is moved so as to project in the path of the movement of the ink jet device 65.

When the ink jet device 65 is moved from the home position to the recording start position, the cap 62 and the blade 61 are at the same positions as the above-described positions in wiping. As a result, the orifice surface of the ink jet device 65 is wiped even during the movement of the ink jet device 65.

The recording head 65 is moved to the home position adjacent to the recording region not only at the end of recording and during the recovery of discharging (the operation of sucking an ink from an orifice in order to recover the normal discharge of an ink from an orifice), but also at predetermined intervals when it is moved in the recording region for the purpose of recording. This movement causes the above-described wiping.

Figure 4:
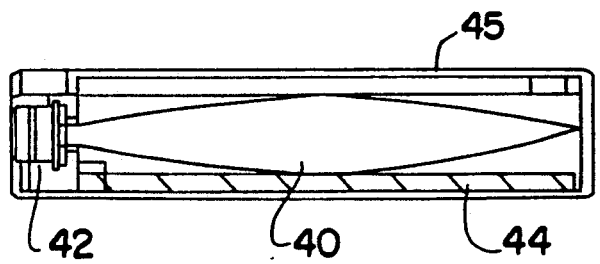
FIG. 4 is a longitudinal sectional view of an ink cartridge.

FIG. 4 is a drawing which shows an example of an ink cartridge 45 for containing the ink to be supplied to the head through an ink supply tube. In the drawing, reference numeral 40 denotes an ink bag for containing the ink to be supplied which has a rubber stopper 42 at its one end. When a needle (not shown) is inserted into the stopper 42, the ink contained in the ink bag 40 can be supplied to the ink jet device 65. Reference numeral 44 denotes an ink absorber for absorbing waste ink. In the present invention, there may preferably be used ink bags in which the surface coming into contact with the ink is formed from polyolefins, in particular polyethylene.

The ink jet recording apparatus used in the present invention is not limited to an apparatus in which a device and an ink cartridge are separately disposed, as described above. The ink jet device shown in FIG. 5 in which a device and an ink cartridge are integrated can be preferably used in the present invention.

Figure 5:
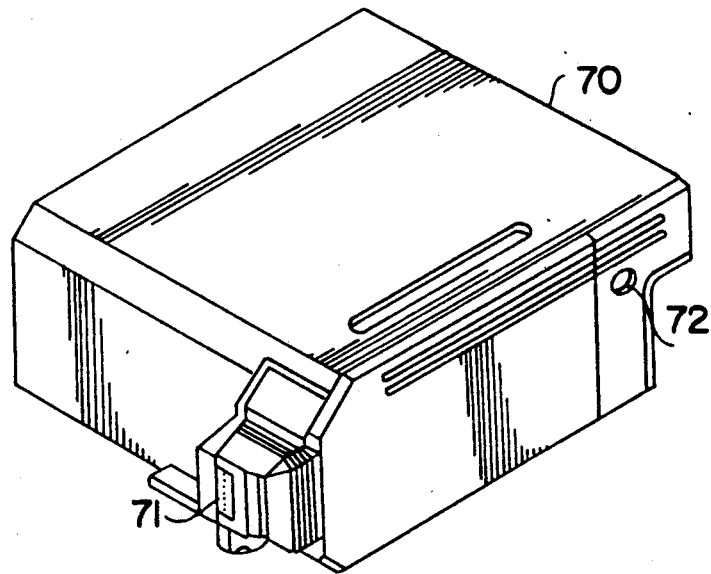
FIG. 5 is a perspective view of an ink jet device.

In FIG. 5, reference number 70 denotes an ink jet device which contains an ink storing member impregnated with ink. The ink in the ink storing member is discharged as ink droplets from a head part 71 have a plurality of orifices. Further, as the ink storing member, there may be used an ink absorber in an ink bag. The head is the same as those referred to in FIGS. 1 and 2.

Reference numeral 72 denotes a communicating hole for allowing the inside of the device 70 to communicate with the atmosphere. As a material for the ink absorber in the present invention, there may preferably be used polyurethane.

The ink jet device 70 is used in place of the ink jet device 65 shown in FIG. 3 and is detachably provided on the carriage 66.

Examples and comparison examples with the present invention will be described below. Hereinafter, all parts by weight are referred to merely as parts.

EXAMPLE 1

| | |
|---|---|
| C.I. Food Black 2 (M = Na) | 1.70 parts |
| The dye of example No. 1 | 0.48 parts |
| The dye of example No. 6 | 0.32 parts |
| Glycerine | 10.00 parts |
| Ethyl alcohol | 2.00 parts |
| Ion-exchanged water | 85.50 parts |

After being stirred thoroughly, the above-described composition was filtered under pressure using a Fluoropore Filter having a pore size of 0.22 μm (Fluoropore is a trademark for a filter manufactured by Sumitomo Denki Kogyo Kabushiki Gaisha) so as to obtain a recording liquid according to the present invention.

Printing was performed using this recording liquid and a recording apparatus incorporating an on-demand type multi-head (orifice size: 50×40 μm; driving voltage: 30 V; and frequency: 4 KHz) in which thermal energy was applied to an ink contained in the recording head so as to generate a droplet. Evaluations on the printing performance, the ejection performance and the storage stability of the resulting printing are shown in Table 3, which will be described later. The following items were evaluated by the following methods under the following conditions.

(1) Printing Density

Printing was conducted on continuous payment slips which were available on the market using all the nozzles so as to prepare a patch. After this patch was air dried inside the room for 24 hours, the optical density thereof was measured. The following standards were used to evaluate the results of measurements:
⊚: an optical density of 1.31 or more
○: an optical density between 1.26 and 1.30
Δ: an optical density between 1.10 and 1.25
X: an optical density of 1.09 or less

(2) Rate of Occurrence of Blur 300 dots were printed in sequence on the continuous payment slips at intervals which ensured that the adjacent dots were not in contact with each other. After this printed matter was air-dried inside a room for 24 hours, the number of irregularly blurred dots was counted using a microscope. The obtained percentage was evaluated using the following standards.
○: 15% or less
Δ: between 16% and 40%
X: 41% or more

(3) Fixing Characteristics (Drying Ability)

Alphanumeric characters were printed on the continuous payment slips. The printed alphanumeric characters were rubbed 10, 20, 30, 40, 50 and 60 seconds after the printing, respectively, using a sheet of lens cleaning paper, and the time in seconds that it took for the smear to be completely removed was measured. The following standards were used to evaluate the results of measurements.
⊚: within 10 seconds
○: between 11 seconds and 20 seconds
Δ: between 21 seconds and 40 seconds
X: 41 seconds or longer

(4) Waterfastness

The patch used in evaluation of Item (1) was greatly immersed in city water contained in a schale for 5 minutes. Thereafter, the patch was taken out of the water and dried. The optical density of the patch was measured in the same manner as that of Item (1), and an optical density residual rate (the optical density of the patch which was immersed/the optical density of the patch which was not yet immersed ×100: percentage) was calculated. The results were evaluated using the following standards.
○: an optical density residual rate of 80% or more
Δ: an optical density residual rate between 60% and 79%
X: an optical density residual rate of 59% or 5 less

(5) Ejection Stability

Printing was conducted on 100 continuous payment slips. The discharge condition was evaluated using the following standards.
○: no anomaly
X: non-ejection or printing disorder

(6) Anti-Clogging characteristics (Fixing Restoring Characteristics)

The recording liquid was stored in a constant-temperature tank at 60° C. for one month. Thereafter, it was left at a room temperature for 24 hours. After a restoration operation (suction by pumping) was conducted on the recording liquid, printing was performed using that recording liquid. The printing state was evaluated using the following standards.
○: normal printing state was restored after the restoration operation was conducted 5 times or less
Δ: normal printing state was restored after the restoration operation was performed between 6 times and 10 times
X: discharge problems or printing disorder occurred after the restoration operation was performed between 6 times and 10 times

(7) Storage Stability 100 cc of recording liquid was poured into a bottle made of a heat-resistant glass. This bottle was sealed and the sealed bottle was stored in a constant-temperature tank which was kept at 60° C. for 3 months. Thereafter, printing was conducted on 100 continuous payment slips using this recording liquid and the above-described recording apparatus. The evaluation standards are as follows.
○: no anomaly
X: ejection problems, printing disorder or discoloration

EXAMPLES 2 TO 6

Recording liquids having the compositions shown in Table 1 were manufactured in the same manner as that of Example 1. The values in parenthesis ( ) are in parts by weight.

Printing performance, discharge performance and storage stability of these recording liquids were evaluated in the same manner as that of Example 1. Table 3 shows the results of the evaluations.

TABLE 1

| Example | Dye | Liquid Medium |
|---|---|---|
| 2 | C.I. Food Black 2 | Glycerine (10.0) |

TABLE 1-continued

| Example | Dye | Liquid Medium |
|---|---|---|
|  | (M = Li) (1.8) | Ethyl alcohol (2.0) |
|  | The dye of Example No. 1 (0.5) | Ion-exchange water (85.4) |
|  | The dye of Example No. 6 (0.2) |  |
| 3 | C.I. Food Black 2 (M = Na) (1.8) | Glycerine (10.0) Ethyl alcohol (3.0) |
|  | The dye of Example No. 1 (1.0) | Ion-exchanged water (84.0) |
|  | The dye of Example No. 6 (0.2) |  |
| 4 | C.I. Food Black 2 (M = Li) (1.7) | Glycerine (10.0) Ethyl alcohol (2.0) |
|  | The dye of Example No. 1 (0.5) | Ion-exchanged water (85.5) |
|  | The dye of Example No. 6 (0.3) |  |
| 5 | C.I. Food Black 2 (M = Li) (1.2) | Glycerine (12.0) Isopropyl alcohol (3.0) |
|  | The dye of Example No. 8 (1.3) | Ion-exchanged water (82.0) |
| 6 | C.I. Food Black 2 (M = Na) (1.5) | Glycerine (13.0) n-butyl alcohol (3.0) |
|  | The dye of Example No. 3 (1.0) | Ion-exchanged water (81.5) |

Comparison Examples 1 to 6

The recording liquids having the compositions shown in Table 2 were prepared in the same manner as that of Example 1.

Printing performance, discharge performance and storage stability of these recording liquids were evaluated in the same manner as that of Example 1. Table 3 shows the results of the evaluations.

TABLE 2

| Comparison Example | Dye | Liquid Medium |
|---|---|---|
| 1 | C.I. Food Black 2 (2.5) | Glycerine (10.0) Ethyl alcohol (2.0) Ion-exchanged water (85.5) |
| 2 | The dye of Example No. 1 (2.5) | Glycerine (10.0) Ethyl alcohol (2.0) Ion-exchanged water (85.5) |
| 3 | The dye of Example No. 6 (2.5) | Glycerine (10.0) Ethyl alcohol (2.0) Ion-exchanged water (85.5) |
| 4 | C.I. Food Black 2 (M = Na) (2.5) C.I. Acid Blue 9 (0.3) C.I. Acid Yellow 23 (0.2) | Glycerine (12.0) Ethyl alcohol (4.0) Ion-exchanged water (81.1) |
| 5 | C.I. Food Black 2 (M = Na) (1.5) The dye of Example No. 1 (0.5) The dye of Example No. 6 (0.4) | Triethylenglycol (17.0) Ethyl alcohol (3.0) Ion-exchanged water (77.6) |
| 6 | C.I. Food Black 2 (M = Na) (1.7) The dye of Example No. 1 (0.5) The dye of Example No. 6 (0.3) | Glycerine (13.0) Noigen P (surface-active agent) (0.4) Ion-exchanged water (84.1) |

TABLE 3

| | Evaluation Item | | | | | | |
|---|---|---|---|---|---|---|---|
| | (1) | (2) | (3) | (4) | (5) | (6) | (7) |
| Example | | | | | | | |
| 1 | ○ | ○ | ○ | ○ | ○ | ○ | ○ |
| 2 | ○ | ○ | ○ | ○ | ○ | ○ | ○ |
| 3 | ○ | ○ | ○ | ○ | ○ | ○ | ○ |
| 4 | ○ | ○ | ○ | ○ | ○ | ○ | ○ |
| 5 | △ | ○ | ○ | ○ | ○ | ○ | ○ |
| 6 | ○ | ○ | ○ | △ | ○ | ○ | ○ |
| Comparison Example | | | | | | | |
| 1 | ○ | ○ | ○ | × | ○ | ○ | ○ |
| 2 | △ | ○ | ○ | △ | ○ | ○ | ○ |
| 3 | × | ○ | ○ | ○ | ○ | ○ | ○ |
| 4 | ○ | ○ | ○ | × | ○ | ○ | ○ |
| 5 | ○ | × | △ | ○ | ○ | ○ | ○ |
| 6 | △ | × | ○ | ○ | ○ | ○ | ○ |

EXAMPLE 7

| | |
|---|---|
| C.I. Food Black 2 (M = Na) | 1.50 parts |
| The dye of Example No. 1 | 0.90 parts |
| The dye of Example No. 6 | 0.60 parts |
| Glycerine | 5.00 parts |
| IPA (Isopropyl alcohol) | 4.00 parts |
| Ion-exchanged water | 83.00 parts |
| Urea | 5.00 parts |

The recording liquid having the above-described composition was prepared in the same manner as that of Example 1.

Printing performance, ejection performance and storage stability of the recording liquid was evaluated in the same manner as that of Example 1. Table 6 shows the results of the evaluations.

| | | |
|---|---|---|
| SK: | Canon NP Dry SK | |
| DK: | Canon NP Dry DK | Copying paper |
| XX: | Xerox 4024 DP | |
| Cont: | Continuous payment slips | |

EXAMPLES 8 TO 14

The recording liquids having the compositions shown in Table 4 were prepared in the same manner as that of Example 1.

Printing performance, ejection performance and storage stability of the recording liquids were evaluated in the same manner as that of Example 7. Table 6 shows the results of the evaluations.

TABLE 4

| Example | Dye | Liquid Medium |
|---|---|---|
| 8 | C.I. Food Black 2 (M = Li) (2.0) | Glycerine (5.0) Thiodiglycol (5.0) |
|  | The dye of Example No. 1 (1.2) | Isopropyl alcohol (4.0) Urea (5.0) |
|  | The dye of Example No. 6 (0.8) | Ion-exchanged water (77.7) |
| 9 | C.I. Food Black 2 (M = Na) (1.8) | Glycerine (5.0) Thiourea (5.0) |
|  | The dye of Example No. 1 (0.9) | Isopropyl alcohol (3.0) Ion-exchanged water (83.0) |
|  | The dye of Example No. 6 (0.6) |  |
| 10 | C.I. Food Black 2 (M = Li) (1.7) | Glycerine (7.0) Thiourea (6.0) |
|  | The dye of Example No. 1 (1.2) | Isopropyl alcohol (4.0) Thiodiglycol (4.0) |
|  | The dye of Example No. 6 (0.6) | Ion-exchanged water (75.5) |
| 11 | C.I. Food Black 2 (M = Li) | Glycerine (6.0) |

TABLE 4-continued

| Example | Dye | Liquid Medium |
|---|---|---|
| | (1.0)<br>The dye of Example No. 8<br>(2.0) | Thiourea (5.0)<br>Ethyl alcohol (5.0)<br>Ion-exchanged water (81.0) |
| 12 | C.I. Food Black 2 (M = Na)<br>(1.5)<br>The dye of Example No. 3<br>(1.5) | Glycerine (5.0)<br>Urea (5.0)<br>Isopropyl alcohol (4.0)<br>Pure water (83.0) |
| 13 | C.I. Food Black 2 (M = Li)<br>(1.5)<br>The dye of Example No. 1<br>(0.9)<br>The dye of Example No. 6<br>(0.6) | Glycerine (5.0)<br>Urea (5.0)<br>Isopropyl alcohol (4.0)<br>Ion-exchanged water (83.0) |
| 14 | C.I. Food Black 2 (M = Li)<br>(1.5)<br>The dye of Example No. 1<br>(0.9)<br>The dye of Example No. 6<br>(0.6) | Glycerine (4.0)<br>Thiourea (5.0)<br>n-butyl alcohol (3.0)<br>Ion-exchanged water (85.0) |

TABLE 5-continued

| Example | Dye | Liquid Medium |
|---|---|---|
| 10 | C.I. Food Black 2 (M = Na)<br>(3.0)<br>C.I. Acid Blue 9<br>(0.3)<br>C.I. Acid Yellow 23<br>(0.2) | Glycerine (6.0)<br>Urea (5.0)<br>Ethyl alcohol (4.0)<br>Ion-exchanged water (77.5)<br>Thiodiglycol (4.0) |
| 11 | C.I. Food Black 2 (M = Na)<br>(2.0)<br>The dye of Example No. 1<br>(1.2)<br>The dye of Example No. 6<br>(0.8) | Thiodiglycol (5.0)<br>Urea (5.0)<br>Isopropyl alcohol (4.0)<br>Ion-exchanged water (77.7) |
| 12 | C.I. Food Black 2 (M = Na)<br>(2.0)<br>The dye of Example No. 1<br>(1.2)<br>The dye of Example No. 6<br>(0.8) | Glycerine (5.0)<br>Thiodiglycol (5.0)<br>Noigen P (surface-active agent) (0.4)<br>Ion-exchanged water (86.3) |

TABLE 6

| | Evaluation Item Paper | | | | | | | | | | | | | | | |
|---|---|---|---|---|---|---|---|---|---|---|---|---|---|---|---|---|
| | (1) | | | | (2) | | | | (3) | | | | (4) | (5) | (6) | (7) |
| | SK | DK | XX | Cont | SK | DK | XX | Cont | SK | DK | XX | Cont | Cont | Cont | Cont | Cont |
| Example 7 | ⊙ | ⊙ | ○ | ○ | ○ | ○ | ○ | ○ | ⊙ | ⊙ | ⊙ | ⊙ | ○ | ○ | ○ | ○ |
| Example 8 | ⊙ | ⊙ | ⊙ | ⊙ | ○ | ○ | ○ | ○ | ⊙ | ⊙ | ⊙ | ⊙ | ○ | ○ | ○ | ○ |
| Example 9 | ⊙ | ⊙ | ○ | ⊙ | ○ | ○ | ○ | ○ | ⊙ | ⊙ | ⊙ | ○ | ○ | ○ | ○ | ○ |
| Example 10 | ⊙ | ⊙ | ⊙ | ⊙ | ○ | ○ | ○ | ○ | ⊙ | ⊙ | ⊙ | ⊙ | ○ | ○ | ○ | ○ |
| Example 11 | ○ | ○ | ○ | ○ | ○ | ○ | ○ | ○ | ⊙ | ⊙ | ⊙ | ○ | ○ | ○ | ○ | ○ |
| Example 12 | ⊙ | ⊙ | ○ | ○ | ○ | ○ | ○ | ○ | ⊙ | ⊙ | ⊙ | ⊙ | △ | ○ | ○ | ○ |
| Example 13 | ⊙ | ⊙ | ⊙ | ⊙ | ○ | △ | ○ | ○ | ⊙ | ⊙ | ⊙ | ⊙ | ○ | ○ | ○ | ○ |
| Example 14 | ⊙ | ⊙ | ⊙ | ⊙ | ○ | △ | ○ | ○ | ⊙ | ⊙ | ⊙ | ⊙ | ○ | ○ | ○ | ○ |
| Comparison Example 7 | ⊙ | ⊙ | ○ | ⊙ | ○ | △ | ○ | ○ | ⊙ | ⊙ | ⊙ | ⊙ | x | ○ | ○ | ○ |
| Comparison Example 8 | ○ | ○ | x | △ | ○ | ○ | ○ | ○ | ⊙ | ⊙ | ⊙ | ⊙ | △ | ○ | ○ | ○ |
| Comparison Example 9 | x | x | x | x | ○ | ○ | ○ | ○ | ⊙ | ⊙ | ⊙ | ⊙ | ○ | ○ | ○ | ○ |
| Comparison Example 10 | ⊙ | ⊙ | ⊙ | ⊙ | ○ | △ | ○ | ○ | ⊙ | ⊙ | ⊙ | ⊙ | x | ○ | ○ | ○ |
| Comparison Example 11 | ⊙ | ⊙ | ⊙ | ⊙ | ○ | ○ | ○ | ○ | ⊙ | ⊙ | ⊙ | ⊙ | ○ | ○ | x | x |
| Comparison Example 12 | ⊙ | ⊙ | ⊙ | ⊙ | x | x | x | x | ⊙ | ⊙ | ⊙ | ⊙ | ○ | ○ | x | x |

COMPARISON EXAMPLE 7 TO 12

The recording liquids having the compositions shown in Table 5 were prepared in the same manner as that of Example 7.

Printing performance, ejection performance and storage stability of the recording liquids were evaluated in the same manner as that of Example 7. Table 6 shows the results of the evaluations.

TABLE 5

| Example | Dye | Liquid Medium |
|---|---|---|
| 7 | C.I. Food Black 2 (M = Na)<br>(3.0) | Glycerine (5.0)<br>Ion-exchanged water (83.0)<br>Isopropyl alcohol (4.0)<br>Urea (5.0) |
| 8 | The dye of Example No. 1<br>(3.0) | Glycerine (5.0)<br>Urea (5.0)<br>Isopropyl alcohol (4.0)<br>Ion-exchanged water (83.0) |
| 9 | The dye of Example No. 6<br>(3.0) | Glycerine (5.0)<br>Urea (5.0)<br>Isopropyl alcohol (4.0)<br>Ion-exchanged water (83.0) |

Further, with respect to each ink in Examples 1 to 14, the ink absorber of the ink-jet device as shown in FIG. 5 was impregnated with the ink. Then the ink jet apparatus as shown in FIG. 3 was allowed to carry the ink jet device. Recording was performed using of the ink jet apparatus. Good recording showing excellent discharge properties was realized.

As will be understood from the foregoing description, the recording liquid according to the present invention has the following advantages:

(1) It allows vivid, high-quality and high-density images to be printed on various types of sheets of paper.

(2) It exhibits excellent fixing characteristics (dries quickly), and eliminates smear of printed matters caused by rubbing.

(3) The characteristics thereof do not change during a long period of storage, thus enabling stable discharge.

(4) It allows printed images to exhibit excellent waterfastness and lightfastness.

(5) It prevents a recording head from drying quickly, thereby ensuring a stable ejection when a recording is restarted after it has been suspended over a long period of time.

(6) It ensures a stable ejection and causes no problems when employed in a recording method which utilizes thermal energy.

Thus, the recording liquid according to the present invention is suitable for use in an ink jet recording method.

The present invention is not to be limited except as set forth in the following claims.

What is claimed is:

1. An ink jet device comprising
an ink storing member impregnated with a recording liquid comprising: a dye, glycerine, said glycerine being present in said recording liquid in an amount between about 1 wt. % and 30 wt. % based on the total weight of said recording liquid, an aliphatic monohydric alcohol, said aliphatic monohydric alcohol being present in said recording liquid in an amount between 0.1 wt. % and 10 wt. % based on the total weight of said recording liquid and water, said dye being a mixture of C.I. Food Black 2 and at least one compound selected from compounds which are represented by the following general formulas (I) and (II):

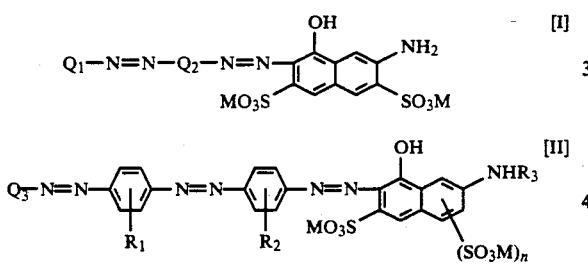

wherein Q1 is a phenyl group substituted with a lower alkycarbonylamino group or a lower alkoxy group, a naphthyl group substituted with a lower alkylcarbonylamino group and a lower alkoxy group or a naphthyl group substituted with a $SO_3M$ group, Q2 is a naphthyl group substituted with a $SO_3M$ group or a phenyl group substituted with a lower alkoxy group, Q3 is a phenyl group, a naphthyl group, a phenyl group substituted with a $SO_3M$ group or a naphthyl group substituted with a $SO_3M$, $R_1$ and $R_2$ are each a lower alkyl group, a lower alkoxy group or a lower alkylcarbonylamino group, $R_3$ is a hydrogen or a phenyl group substituted with a $SO_3M$ group, n is 0 or 1, and M is an alkaline metal or an ammonium cation; wherein said Food Black 2 and said at least one compound represented by said general formula [I] and [II] are mixed in a weight ratio from 8:2 to 2:8; and
a head having a plurality of orifices for discharging said ink as ink droplets.

2. An ink jet device according to claim 1, wherein said ink storing member is an ink absorber or an ink bag.

3. An ink jet device according to claim 1, wherein said head has a heating head to provide heat energy to said ink for discharging ink droplets.

4. An ink jet device according to claim 1, wherein said compound represented by the general formulas (I) has the following formula:

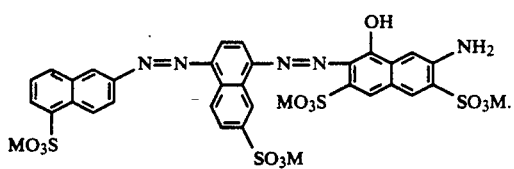

5. An ink jet device according to claim 1, wherein said compound represented by the general formula (II) has the following formula:

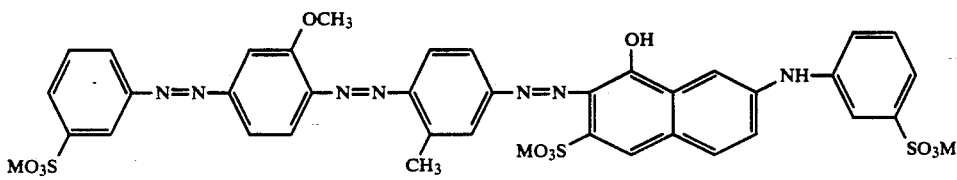

wherein M is an alkaline metal or an ammonium cation.

6. An ink jet device comprising
an ink storing member impregnated with a recording liquid comprising: a dye, glycerine, said glycerine being present in said recording liquid in an amount between about 1 wt. % and 30 wt. % based on the total weight of said recording liquid, a urea compound selected from the group consisting of urea or thiourea, said urea compound being present in said recording liquid in an amount between 0.5 wt. % and 20 wt. % based on the total weight of said recording liquid, an aliphatic monohyric alcohol, said aliphatic monohydric alcohol being present in said recording liquid in an amount between 0.1 wt. % and 10 wt. % based on the total weight of said recording liquid and water, said dye being a mixture of C.I. Food Black 2 and at least one compound selected from compounds which are represented by the following general formulas (I) and (II):

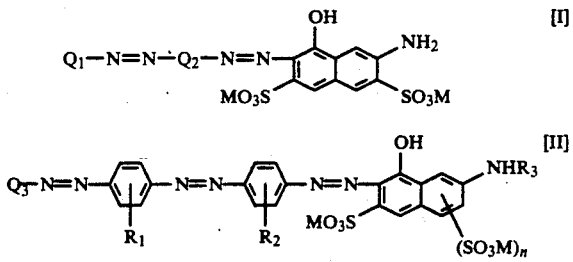

wherein Q1 is a phenyl group substituted with a lower alkycarbonylamino group or a lower alkoxy group, a naphthyl group substituted with a lower alkylcarbonylamino group and a lower alkoxy group or a naphthyl group substituted with a $SO_3M$ group, Q2 is a naphthyl group substituted with a $SO_3M$ group or a phenyl group substituted with a lower alkoxy group, Q3 is a phenyl group, a naphthyl group, a phenyl group substituted with a $SO_3M$ group or a naphthyl group substituted with a $SO_3M$ group, $R_1$ and $R_2$ are each a lower alkyl group, a lower alkoxy group or a lower alkylcarbonylamino group, $R_3$ is a hydrogen or a phenyl group substituted with a SO₃M group, n is 0 or 1, and M is an alkaline metal or an ammonium cation; wherein said Food Black 2 and said at least one compound represented by said general formula [I] and [II] are mixed in a weight ratio from 8:2 to 2:8; and a head having a plurality of orifices for discharging said ink as ink droplets.

7. An ink jet device according to claim 6, wherein said ink storing member is an ink absorber or an ink bag.

8. An ink jet device according to claim 6, wherein said head has a heating head to provide to said ink a heat energy for discharging ink droplets.

9. An ink jet device according to claim 6, wherein said compound represented by the general formula (I) has the following formula:

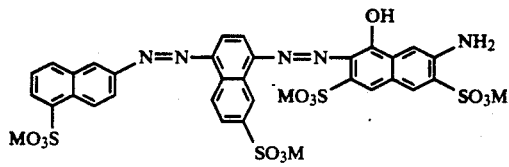

wherein M is an alkaline metal or an ammonium cation.

10. An ink jet device according to claim 6, wherein said compound represented by the general formula (II) has the following formula:

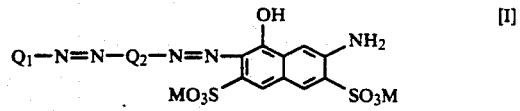

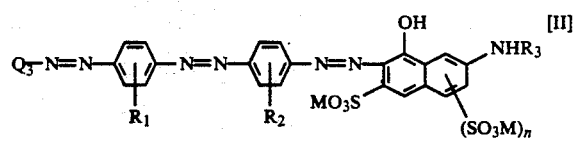

wherein Q1 is a phenyl group substituted with a lower alkyl carbonyl group or a lower alkoxy group, a naphthyl group substituted with a lower alkyl carbonyl group and a lower alkoxy group or a naphthyl group substituted with a SO₃M group, Q2 is a naphthyl group substituted with a SO₃M group or a phenyl group substituted with a lower alkoxy group, Q3 is a phenyl group, a naphthyl group, a phenyl group substituted with a SO₃M group, R₁ and R₂ are each a lower alkyl group, a lower alkoxy group or a lower alkylcarbonylamino group, R₃ is a hydrogen or a phenyl group substituted with a SO₃M group, n is 0 or 1, and M is an alkaline metal or an ammonium cation; wherein said Food Black 2 and said at least one compound represented by said general formula [I] and [II] are mixed in

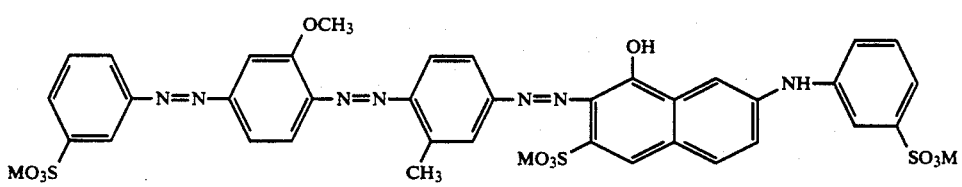

wherein M is an alkaline metal or an ammonium cation.

11. An ink jet device comprising an ink storing member impregnated with a recording liquid comprising: a dye, glycerine, said glycerine being present in said recording liquid in an amount between about 1 wt. % and 30 wt. % based on the total weight of said recording liquid, thiodiglycol, said thiodiglycol being present in said recording liquid in an amount between 1 wt. % and 30 wt. % based on the total weight of the recording liquid, urea, said urea being present in said recording liquid in an amount between 0.5 wt. % and 20 wt. % based on the total weight of the recording liquid, isopropyl alcohol, said isopropyl alcohol being present in said recording liquid in an amount between 0.1 wt. % and 10 wt. % based on the total weight of the recording liquid, and water, said dye being a mixture of C.I. Food Black 2 and at least one compound selected from compounds which are represented by the following general formulas (I) and (II):

a weight ratio from 8:2 to 2:8; and a head having a plurality of orifices for discharging said ink as ink droplets.

12. An ink jet device according to claim 11, wherein said ink storing member is an ink absorber or an ink bag.

13. An ink jet device according to claim 11, wherein said head has a heating head to provide to said ink a heat energy for discharging ink droplets.

14. An ink jet device according to claim 11, wherein said compound represented by the general formula (I) has the following formula:

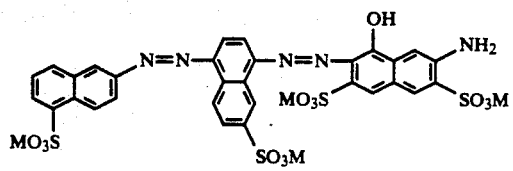

wherein M is an alkaline metal or an ammonium cation.

15. An ink jet device according to claim 11, wherein said compound represented by the general formula (II) has the following formula:

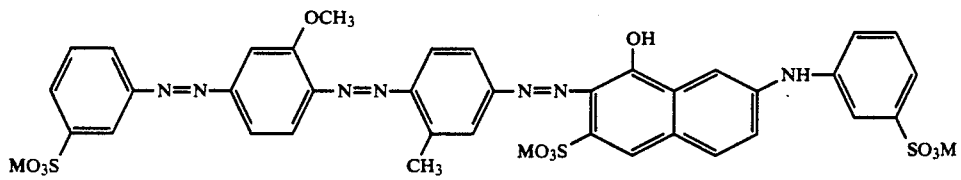

wherein M is an alkaline metal or an ammonium cation.

16. An ink jet recording apparatus comprising an ink jet device comprising an ink storing member impregnated with a recording liquid comprising:

a dye, glycerine, said glycerine being present in said recording liquid in an amount between about 1 wt. % and 30 wt. % based on the total weight of said recording liquid, an aliphatic monohydric alcohol, said aliphatic monohydric alcohol being present in said recording liquid in an amount between 0.1 wt. % and 10 wt. % based on the total weight of said recording liquid and water, said dye being a mixture of C.I. Food Black 2 and at least one compound selected from compounds which are represented by the following general formulas (I) and (II):

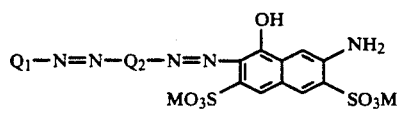

[I]

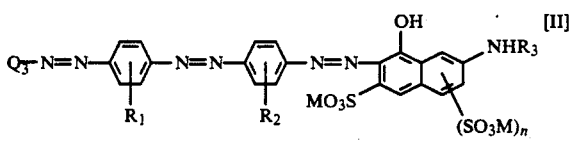

[II]

wherein Q1 is a phenyl group substituted with a lower alkylcarbonylamino group or a lower alkoxy group, a naphthyl group substituted with a lower alkylcarbonylamino group and a lower alkoxy group or a naphthyl group substituted with a SO3M group, Q2 is a naphthyl group substituted with a SO3M group or a phenyl group substituted with a lower alkoxy group, Q3 is a phenyl group, a naphthyl group, a phenyl group substituted with a SO3M group or a naphthyl group substituted with a SO3M group, R1 and R2 are each a lower alkyl group, a lower alkoxy group or a lower alkylcarbonylamino group, R3 is a hydrogen or a phenyl group substituted with a SO3M group, n is 0 or 1, and M is an alkaline metal or an ammonium cation; wherein said Food Black 2 and said at least one compound represented by said general formula [I] and [II] are mixed in a weight ratio from 8:2 to 2:8; and a head having a plurality of orifices for discharging said ink as ink droplets.

17. An ink jet recording apparatus according to claim 16, wherein said ink storing member is an ink absorber or an ink bag.

18. An ink jet recording apparatus according to claim 16, wherein said head was a heating head to provide to said ink a heat energy for discharging ink droplets.

19. An ink jet recording apparatus according to claim 16, wherein said compound represented by the general formula (I) has the following formula:

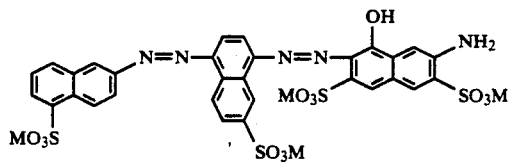

wherein M is an alkaline metal or an ammonium cation.

20. An ink jet recording apparatus according to claim 16, wherein said compound represented by the general formula (II) has the following formula:

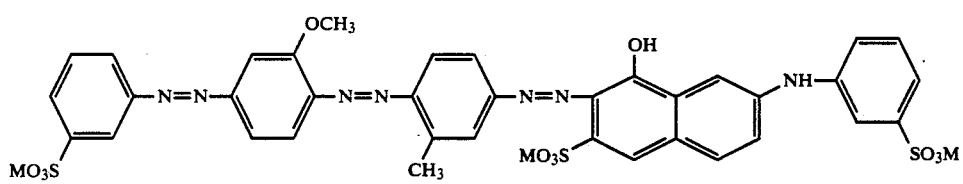

wherein M is an alkaline metal or an ammonium cation.

21. An ink jet recording apparatus comprising
an ink jet device comprising an ink storing member impregnated with a recording liquid comprising: a dye, glycerine, said glycerine being present in said recording liquid in an amount between about 1 wt. % and 30 wt. % based on the total weight of said recording liquid, a urea compound selected from the group consisting of urea or thiourea, said urea compound being present in said recording liquid in an amount between 0.5 wt. % and 20 wt. % based on the total weight of said recording liquid, an aliphatic monohydric alcohol, said aliphatic monohydric alcohol being present in said recording liquid in an amount between 0.1 wt. % and 10 wt. % based on the total weight of said recording liquid and water, said dye being a mixture of C.I. Food Black 2 and at least one compound selected from compounds which are represented by the following general formulas (I) and (II):

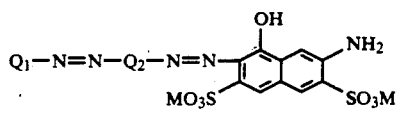

[I]

-continued

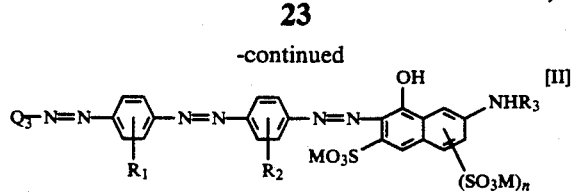

wherein Q1 is a phenyl group substituted with a lower alkycarbonylamino group or a lower alkoxy group, a naphthyl group substituted with a lower alkylcarbonylamino group and a lower alkoxy group or a naphthyl group substituted with a SO3M group, Q2 is a naphthyl group substituted with a SO3M group or a phenyl group substituted with a lower alkoxy group, Q3 is a phenyl group, a naphthyl group, a phenyl group substituted with a SO3M group or a naphthyl group substituted with a SO3M group, R1 and R2 are each a lower alkyl group, a lower alkoxy group or a lower alkylcarbonylamino group, R3 is a hydrogen or a phenyl group substituted with a SO3M group, n is 0 or 1, and M is an alkaline metal or an ammonium cation; wherein said Food Black 2 and said at least one compound represented by said general formula [I] and [II] are mixed in a weight ratio from 8:2 to 2:8; and a head having a plurality of orifices for discharging said ink as ink droplets.

22. An ink jet recording apparatus according to claim 21, wherein said ink storing member is an ink absorber or an ink bag.

23. An ink jet recording apparatus according to claim 21, wherein said head was a heating head to provide to said ink a heat energy for discharging ink droplets.

24. An ink jet recording apparatus according to claim 21, wherein said compound represented by the general formula (I) has the following formula:

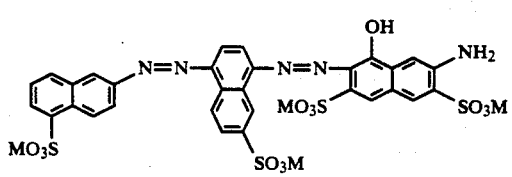

wherein M is an alkaline metal or an ammonium cation.

25. An ink jet recording apparatus according to claim 21, wherein said compound represented by the general formula (II) has the following formula:

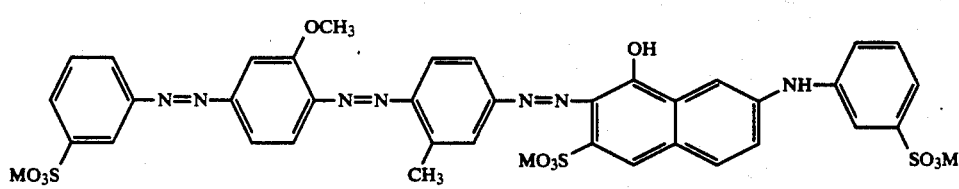

wherein M is an alkaline metal or an ammonium cation.

26. An ink jet recording apparatus comprising an ink jet device comprising an ink storing member impregnated with a recording liquid comprising: a dye, glycerine, said glycerine being present in said recording liquid in an amount between about 1 wt. % and 30 wt. % based on the total weight of said recording liquid, thiodiglycol, said thiodiglycol being present in said recording liquid in an amount between 1 wt. % and 30 wt. % based on the total weight of the recording liquid, urea, said urea being present in said recording liquid in an amount between 0.5 wt. % and 20 wt. % based on the total weight of the recording liquid, isopropyl alcohol, said isopropyl alcohol being present in said recording liquid in an amount between 0.1 wt. % and 10 wt. % based on the total weight of said recording liquid, and water, said dye being a mixture of C.I. Food Black 2 and at least one compound selected from compounds which are represented by the following general formulas (I) and (II):

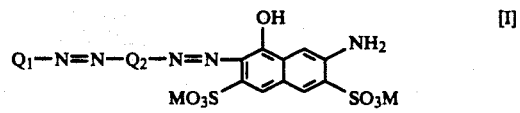

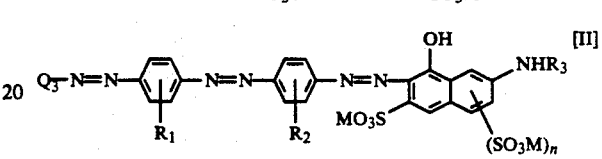

wherein Q1 is a phenyl group substituted with a lower alkyl carbonyl group or a lower alkoxy group, a naphthyl group substituted with a lower alkyl carbonyl group and a lower alkoxy group or a naphthyl group substituted with a SO3M group, Q2 is a naphthyl group substituted with a SO3M group or a phenyl group substituted with a lower alkoxy group, Q3 is a phenyl group, a naphthyl group, a phenyl group substituted with a SO3M group or a naphthyl group substituted with a SO3M group, R1 and R2 are each a lower alkyl group, a lower alkoxy group or a lower alkylcarbonylamino group, R3 is a hydrogen or a phenyl group substituted with a SO3M group, n is 0 or 1, and M is an alkaline metal or an ammonium cation; wherein said Food Black 2 and said at least one compound represented by said general formula [I] and [II] are mixed in a weight ratio from 8:2 to 2:8; and a head having a plurality of orifices for discharging said ink as ink droplets.

27. An ink jet recording apparatus according to claim 26 wherein said ink storing member is an ink absorber or an ink bag.

28. An ink jet recording apparatus according to claim 26, wherein said head was a heating head to provide to said ink a heat energy for discharging ink droplets.

29. An ink jet recording apparatus according to claim 26, wherein said compound represented by the general formula (I) has the following formula:

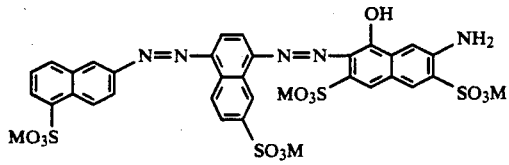

wherein M is an alkaline metal or an ammonium cation.

30. An ink jet recording apparatus according to claim 26, wherein said compound represented by the general formula (II) has the following formula:

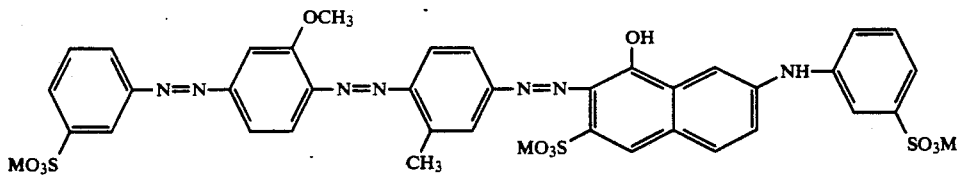

wherein M is an alkaline metal or an ammonium cation.

31. An ink cartridge comprising
an ink bag impregnated with a recording liquid comprising:
a dye, glycerine, said glycerine being present in said recording liquid in an amount between about 1 wt. % and 30 wt. % based on the total weight of said recording liquid, an aliphatic monohydric alcohol, said aliphatic monohydric alcohol being present in said recording liquid in an amount between 0.1 wt. % and 10 wt. % based on the total weight of said recording liquid, and water, said dye being a mixture of C.I. Food Black 2 and at least one compound selected from compounds which are represented by the following general formulas (I) and (II):

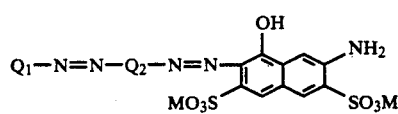

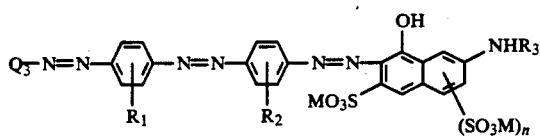

wherein Q1 is a phenyl group substituted with a lower alkylcarbonylamino group or a lower alkoxy group, a naphthyl group substituted with a lower alkylcarbonylamino group and a lower alkoxy group or a naphthyl group substituted with a SO3M group, Q2 is a naphthyl group substituted with a SO3M group or a phenyl group substituted with a lower alkoxy group, Q3 is a phenyl group, a naphthyl group, a phenyl group substituted with a SO3M group or a naphthyl group substituted with a SO3M group, R1 and R2 are each a lower alkyl group, a lower alkoxy group or a lower alkylcarbonylamino group, R3 is a hydrogen or a phenyl group substituted with a SO3M group, n is 0 or 1, and M is an alkaline metal or an ammonium cation, wherein said Food Black 2 and said at least one compound represented by said general formula [I] and [II] are mixed in a weight ratio from 8:2 to 2:8.

32. An ink cartridge according to claim 31, wherein said compound represented by the general formula (I) has the following formula:

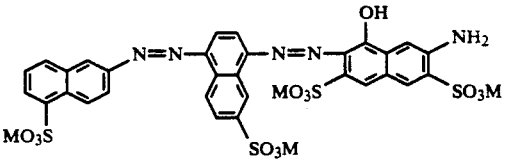

wherein M is an alkaline metal or an ammonium cation.

33. An ink cartridge according to claim 31, wherein said compound represented by the general formula (II) has the following formula:

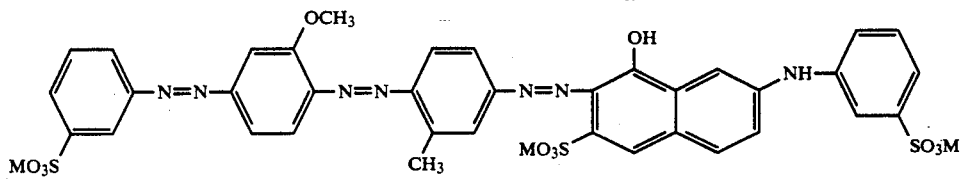

wherein M is an alkaline metal or an ammonium cation.

34. An ink cartridge comprising
an ink bag impregnated with a recording liquid comprising:
a dye, glycerine, said glycerine being present in said recording liquid in an amount between about 1 wt. % and 30 wt. % based on the total weight of said recording liquid, a urea compound selected from the group consisting of urea or thiourea, said urea compound being present in said recording liquid in an amount between 0.5 wt. % and 20 wt. % based on the total weight of said recording liquid, an aliphatic monohydric alcohol, said aliphatic monohydric alcohol being present in said recording liquid in an amount between 0.1 wt. % and 10 wt. % based on the total weight of said recording liquid, and water, said dye being a mixture of C.I. Food Black 2 and at least one compound selected from compounds which are represented by the following general formulas (I) and (II):

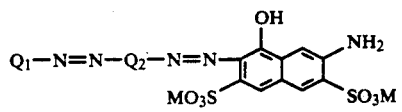

-continued

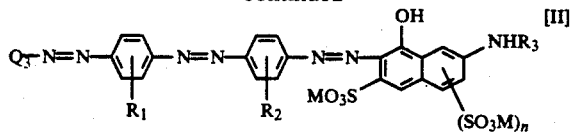

wherein Q1 is a phenyl group substituted with a lower alkylcarbonylamino group or a lower alkoxy group, a naphthyl group substituted with a lower alkylcarbonylamino group and a lower alkoxy group or a naphthyl group substituted with a $SO_3M$ group, Q2 is a naphthyl group substituted with a $SO_3M$ group or a phenyl group substituted with a lower alkoxy group, Q3 is a phenyl group, a naphthyl group, a phenyl group substituted with a $SO_3M$ group or a naphthyl group substituted with a $SO_3M$ group, $R_1$ and $R_2$ are each a lower alkyl group, a lower alkoxy group or a lower alkylcarbonylamino group, $R_3$ is a hydrogen or a phenyl group substituted with a $SO_3M$ group, n is 0 or 1, and M is an alkaline metal or an ammonium cation, wherein said Food Black 2 and said at least one compound represented by said general formula [I] and [II] are mixed in a weight ratio from 8:2 to 2:8.

35. An ink cartridge according to claim 34, wherein said compound represented by the general formula (I) has the following formula:

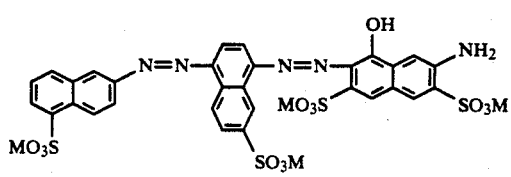

wherein M is an alkaline metal or an ammonium cation.

36. An ink cartridge according to claim 34, wherein said compound represented by the general formula (II) has the following formula:

pyl alcohol, said isopropyl alcohol being present in said recording liquid in an amount between 0.1 wt. % and 10 wt. % based on the total weight of said recording liquid and water, said dye being a mixture of C.I. Food Black 2 and at least one compound selected from compounds which are represented by the following general formulas (I) and (II):

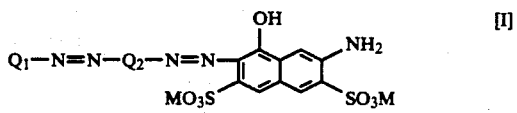

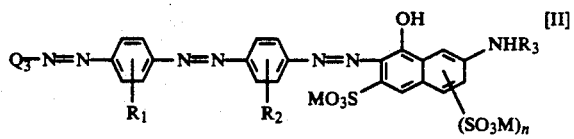

wherein Q1 is a phenyl group substituted with a lower alkyl carbonyl group or a lower alkoxy group, a naphthyl group substituted with a lower alkyl carbonyl group and a lower alkoxy group or a naphthyl group substituted with a $SO_3M$ group, Q2 is a naphthyl group substituted with a $SO_3M$ group or a phenyl group substituted with a lower alkoxy group, Q3 is a phenyl group, a naphthyl group, a phenyl group substituted with a $SO_3M$ group or a naphthyl group substituted with a $SO_3M$ group, $R_1$ and $R_2$ are each a lower alkyl group, a lower alkoxy group or a lower alkylcarbonylamino group, $R_3$ is a hydrogen or a phenyl group substituted with a $SO_3M$ group, n is 0 or 1, and M is an alkaline metal or an ammonium cation, wherein said Food Black 2 and said at least one compound represented by said general formula [I] and [II] are mixed in a weight ratio from 8:2 to 2:8.

38. An ink cartridge according to claim 37, wherein said compound represented by the general formula (I) has the following formula:

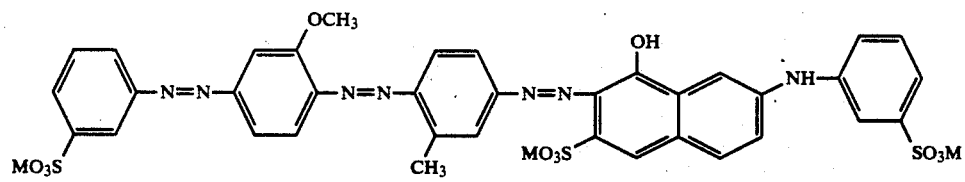

wherein M is an alkaline metal or an ammonium cation.

37. An ink cartridge comprising
an ink bag impregnated with a recording liquid comprising: a dye, glycerine, said glycerine being present in said recording liquid in an amount between about 1 wt. % and 30 wt. % based on the total weight of said recording liquid, thiodiglycol, said thiodiglycol being present in said recording liquid in an amount between 1 wt. % and 30 wt. % based on the total weight of the recording liquid, urea, said urea being present in said recording liquid in an amount between 0.5 wt. % and 20 wt. % based on the total weight of the recording liquid, isopro-

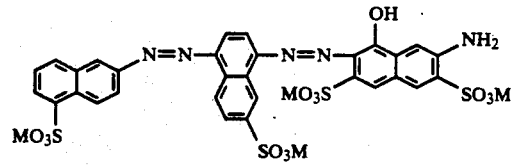

wherein M is an alkaline metal or an ammonium cation.

39. An ink cartridge according to claim 37, wherein said compound represented by the general formula (II) has the following formula:

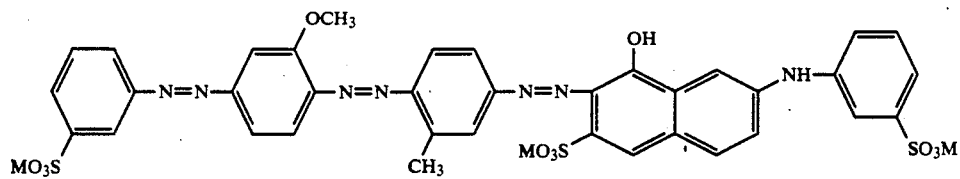
wherein M is an alkaline metal or an ammonium cation.
* * * * *

UNITED STATES PATENT AND TRADEMARK OFFICE
CERTIFICATE OF CORRECTION

PATENT NO. : 5,137,570

DATED : August 11, 1992

INVENTOR(S) : OSAMU NISHIWAKI, ET AL.

Page 1 of 3

It is certified that error appears in the above-identified patent and that said Letters Patent is hereby corrected as shown below:

On the title page:

[54] TITLE

"THEREFORE" should read --THEREFOR--.

[56] REFERENCES CITED

Under U.S. PATENT DOCUMENTS,
"Ohita et al." should read --Chiba et al.--;
"Ohata et al." should read --Ohta et al.--; and
"5,814,037  6/1991  Ohata et al." should read
--4,814,037  6/1989  Ohta et al.--.

COLUMN 1

Line 3, "THEREFORE" should read --THEREFOR--.
Line 18, "he" should read --the--.

COLUMN 3

Line 45, "an" should read --a--.

COLUMN 5

Line 2, "$NH_4^{61}$ ," should read --$NH_4^\oplus$,--.
Line 3, "$NH(C_2H_4OH)_3^{61}$" should read --$NH(C_2H_4OH)_3^\oplus$--.

COLUMN 6

Line 58, "from" should read --form--.

UNITED STATES PATENT AND TRADEMARK OFFICE
CERTIFICATE OF CORRECTION

PATENT NO. : 5,137,570
DATED : August 11, 1992
INVENTOR(S) : OSAMU NISHIWAKI, ET AL.

It is certified that error appears in the above-identified patent and that said Letters Patent is hereby corrected as shown below:

COLUMN 7

Line 12, "carrier" should read --carriers--.
Line 52, "he" should read --the--.

COLUMN 11

Line 18, "Gaisha)" should read --Kaisha)--.

COLUMN 13, Line 5,

TABLE 1-continued, "(0.2)" should read --(0.3)--.

COLUMN 18

Line 2, "formulas" should read --formula--.

COLUMN 19

Line 4, "formula" should read --formulas--.

COLUMN 20

Line 27, "formula" should read --formulas--.

COLUMN 22

Line 14, "was" should read --has--.

COLUMN 23

Line 24, "formula" should read --formulas--.
Line 33, "was" should read --has--.

UNITED STATES PATENT AND TRADEMARK OFFICE
CERTIFICATE OF CORRECTION

PATENT NO. : 5,137,570

DATED : August 11, 1992

INVENTOR(S) : OSAMU NISHIWAKI, ET AL.

It is certified that error appears in the above-identified patent and that said Letters Patent is hereby corrected as shown below:

<u>COLUMN 24</u>

Line 40, "formula" should read --formulas--.
   Line 49, "was" should read --has--.

<u>COLUMN 28</u>

Line 36, "formula" should read --formulas--.

Signed and Sealed this

Twenty-first Day of September, 1993

Attest:

BRUCE LEHMAN

Attesting Officer     Commissioner of Patents and Trademarks